UNITED STATES PATENT OFFICE.

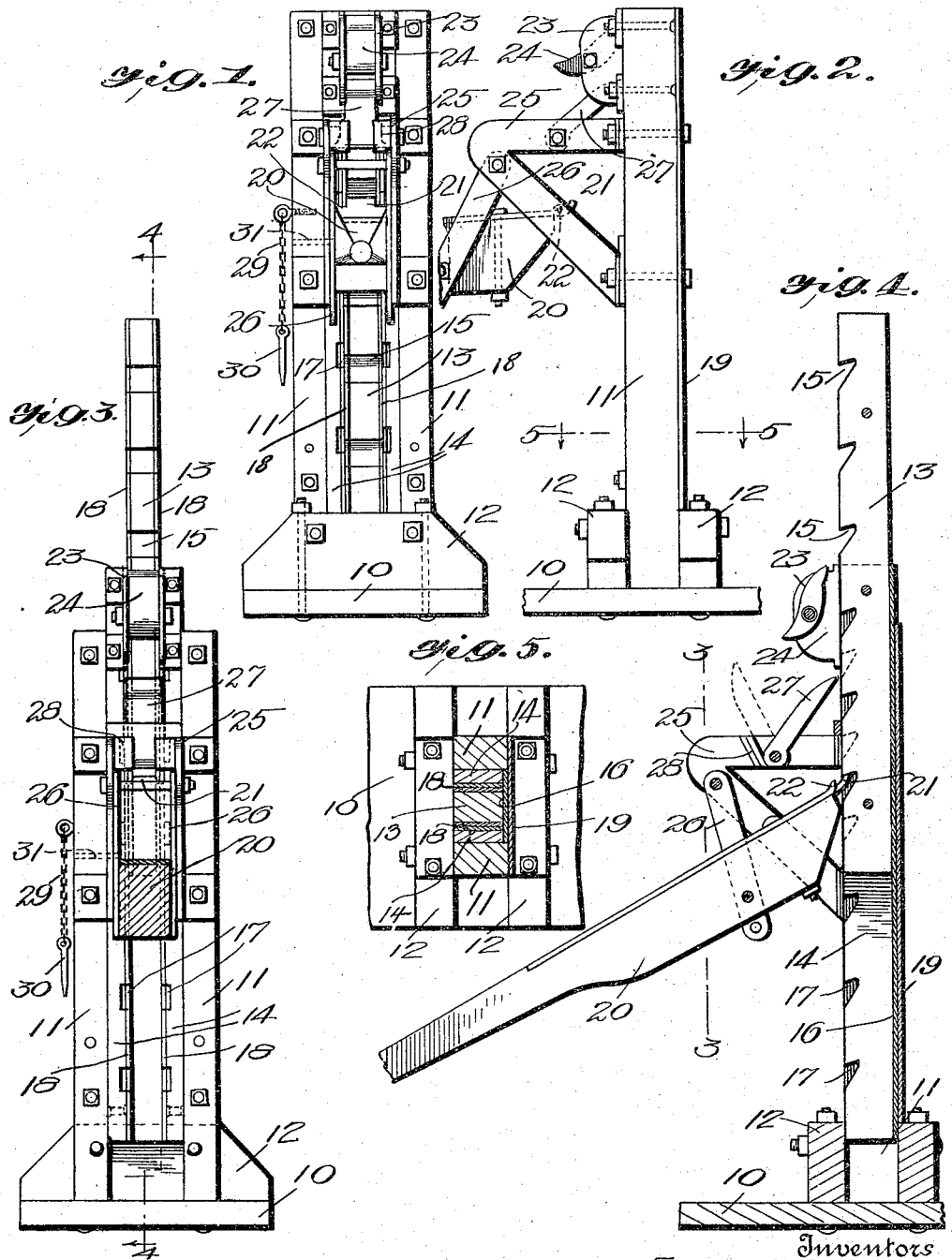

EUGENE E. SNYDER AND EDWARD W. HARRIS, OF RAYMOND, ALBERTA, CANADA.

LIFTING DEVICE.

1,204,710.  Specification of Letters Patent.  Patented Nov. 14, 1916.

Application filed December 7, 1915. Serial No. 65,632.

*To all whom it may concern:*

Be it known that we, EUGENE E. SNYDER and EDWARD W. HARRIS, citizens of the United States, residing at Raymond, in the Province of Alberta and Dominion of Canada, have invented new and useful Improvements in Lifting Devices, of which the following is a specification.

This invention relates to lifting devices characterized by a sliding lifting bar having a step-by-step movement, and operated by a lever.

The invention has for its object to provide a novel and improved lifting device of the kind stated, having two slidably or telescopically connected lifting bars, adapted to be operated in succession to obtain a wide range of operation or a greater height.

The object stated is attained by means of a combination and arrangement of parts to be hereinafter described and claimed and in order that the same may be better understood, reference is had to the accompanying drawing, in which—

Figure 1 is a front elevation of the device; Fig. 2 is a side elevation thereof; Fig. 3 is a front elevation showing the lifting bars in elevated position; Fig. 4 is a vertical section on the line 4—4 of Fig. 3, and Fig. 5 is a horizontal section on the line 5—5 of Fig. 2.

Referring specifically to the drawing, 10 denotes a base from which rise, to a suitable height, two standards 11 between which are mounted the lifting bars to be presently described, the standards being spaced laterally to accommodate the same. On the base are mounted blocks 12 which firmly secure the standards in upright position.

The lifting bars are composed of two slidably or telescopically connected sections 13 and 14, respectively, the former being the inner section and the latter the outer section. The inner section comprises a bar having in its front face a series of vertically spaced recesses 15 forming a rack. The outer section comprises two bars, connected at the back in laterally spaced relation, by means of a metal plate 16. In the front edges of the bars 14 are recesses 17 forming a rack, the recesses being arranged in pairs, and the members of the pairs being opposite each other. The contiguous side faces of the bars 13 and 14 have a metal lining 18. The standards 10 are connected at the back by a metal plate 19 against which the plate 16 slidably fits.

At 20 is indicated a lever for operating the lifting bars, one after the other. The inner bar 13 is first lifted, and after locking the same to the outer bars 14, the latter are lifted, so that the inner bar is elevated still higher. This operation is effected by the following means: The operating end of the lever 20 has an iron 21 which is shaped to enter the recesses 15, and has side lugs 22 to enter the recesses 17. The lifting bars 14, at the upper end thereof, carry bearings 23 which support a pivoted dog 24 adapted to enter the recesses 15 and thus prevent the bar 13 from slipping down relative to the bars 14. On the standards 11 are mounted bracket members 25 carrying pivoted links 26, which latter support the lever 20 and provide a swinging fulcrum therefor. The bracket members 25 also carry a pivoted dog 27 adapted to engage the recesses 17 and prevent the lifting bars 14 from slipping down. Stops 28 on the bracket members prevent the dog from falling back too far. To one of the standards 11 is attached a chain 29 carrying a pin 30 for locking the lifting bars 14 while the lifting bar 13 is being elevated, said pin being passed through alined apertures 31 in the standard 11 and the adjacent lifting bar 14.

The jack is operated as follows: Both lifting bars 13 and 14 being down and the bars 14 being locked by the pin 30, the lever 20 is operated to elevate the bar 13, the bars 14 remaining stationary. After the bar 13 has been elevated by the lever as far as it can go, it can be further elevated by now elevating the lifting bars 14 by means of the lever, the lifting bars 14 being first unlocked by removing the pin 30, and the lifting bar 13 being coupled to the bars 14 by the dog 24. Upon continuing the operation of the lever, the bars 14 are elevated carrying the bar 13 along with them, and when the desired height is reached, the dog 27 locks the bars 14. The swinging support 26 of the lever enables the same to be shifted to take hold of the lifting bars in succession as described.

We claim:—

A lifting device comprising a support, a pair of lifting bars carried by the support, one of said bars being telescopically mounted within the other and having a rack on its front face, and said other bar comprising two members connected in laterally spaced relation and having racks on their front edges, the rack teeth of the respective edges being in pairs and opposite each other, a lever having a toe to engage the first mentioned rack, and provided with toes on opposite sides of said toe to engage the second mentioned racks, a swinging fulcrum for the lever for successively engaging the respective toes with the racks of the respective bars, and means for fastening the lifting bars together.

In testimony whereof we affix our signatures.

EUGENE E. SNYDER.
EDWARD W. HARRIS.

Copies of this patent may be obtained for five cents each, by addressing the "Commissioner of Patents, Washington, D. C."